(12) United States Patent
Wolfgang et al.

(10) Patent No.: US 7,647,456 B2
(45) Date of Patent: Jan. 12, 2010

(54) COMPARING DATA IN A NEW COPY RELATIONSHIP TO DATA IN PREEXISTING COPY RELATIONSHIPS FOR DEFINING HOW TO COPY DATA FROM SOURCE TO TARGET

(75) Inventors: John Jay Wolfgang, Winston-Salem, NC (US); Kenneth Wayne Boyd, Tucson, AZ (US); Kenneth Fairclough Day, III, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 11/293,608

(22) Filed: Dec. 1, 2005

(65) Prior Publication Data
US 2007/0130222 A1 Jun. 7, 2007

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 17/30* (2006.01)
*G06F 15/16* (2006.01)

(52) U.S. Cl. .................. 711/154; 707/203; 707/204; 711/161; 711/162; 711/111; 711/112; 711/202; 709/217; 709/219; 709/245

(58) Field of Classification Search ...................... None
See application file for complete search history.

(56) References Cited

U.S. PATENT DOCUMENTS 5,875,479 A    2/1999   Blount et al.

(Continued)

OTHER PUBLICATIONS

M. Blunden, et al., "Implementing ESS Copy Services on S/390", IBM Corporation, Document # SG24-5680-00, Dec. 2000, Chaps. 1 and 4.

(Continued)

*Primary Examiner*—Hong Kim
*Assistant Examiner*—Marwan Ayash
(74) *Attorney, Agent, or Firm*—David W. Victor; Konrad Raynes & Victor LLP

(57) ABSTRACT

Provided are a method, system, and program for establishing copy relationships to copy source data to target data. A request is received to establish a copy relationship indicating to copy source data to target data. A determination is made as to whether the source data defined in the request comprises target data defined in a preexisting copy relationship. A determination is made as to whether base source data copied to the target data in the preexisting copy relationship also comprises the source data indicated in the request in response to determining that the source data defined in the request comprises target data in the preexisting copy relationship. A new copy relationship is defined to copy the determined base source data to the target data indicated in the request.

24 Claims, 4 Drawing Sheets

U.S. PATENT DOCUMENTS

| | | | | |
|---|---|---|---|---|
| 5,970,502 | A | * | 10/1999 | Salkewicz et al. ........... 707/201 |
| 6,076,148 | A | * | 6/2000 | Kedem ....................... 711/162 |
| 6,189,079 | B1 | * | 2/2001 | Micka et al. ................. 711/162 |
| 6,611,901 | B1 | * | 8/2003 | Micka et al. ................. 711/162 |
| 6,643,671 | B2 | * | 11/2003 | Milillo et al. ............... 707/204 |
| 6,799,258 | B1 | * | 9/2004 | Linde ........................ 711/162 |
| 7,185,157 | B2 | * | 2/2007 | Micka et al. ................. 711/162 |
| 2004/0260870 | A1 | * | 12/2004 | Factor et al. ................ 711/202 |
| 2005/0114465 | A1 | * | 5/2005 | Coronado et al. ........... 709/214 |
| 2005/0268054 | A1 | * | 12/2005 | Werner et al. ............... 711/162 |

OTHER PUBLICATIONS

"IBM TotalStorage Enterprise Storage Server Enhances Business Efficiency and Continuance with FlashCopy and PPRC Version 2", IBM Corporation, Hardware Announcement, May 13, 2003, pp. 1-4.

C. Warrick, et al., "IBM TotalStorage Enterprise Storage Server: Implementing ESS Copy Services with IBM eServer zSeries", IBM Corporation, Document 4 SG24-5680-04, Jul. 2004, Chaps. 1 and 2.

"IBM TotalStorage Enterprise Storage Server Resiliency Family", IBM Corporation, Document # G225-6974-02, Apr. 2004.

* cited by examiner

Copy Relationship

COMPARING DATA IN A NEW COPY RELATIONSHIP TO DATA IN PREEXISTING COPY RELATIONSHIPS FOR DEFINING HOW TO COPY DATA FROM SOURCE TO TARGET

BACKGROUND OF THE INVENTION

1. Field of the Invention

The present invention relates to a method, system, and program for establishing copy relationships to copy source data to target data.

2. Description of the Related Art

In certain system architectures, a user may define a copy relationship so that data in one or more source data sets may be mirrored at secondary target data sets, which may be in separate storage devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time copy relationship between source and target volumes on different devices. Once the logical relationship is established, hosts may then have immediate access to data on the source and target volumes, and the data may be copied as part of a background operation. Reads to any tracks in the target cache that have not been updated with the data from the source causes the source track to be staged to the target cache before access is provided to the track from the target cache. Any reads of data on target tracks that have not been copied over cause the data to be copied over from the source device to the target cache so that the target has the copy from the source that existed at the point-in-time of the FlashCopy® operation. Further, any writes to tracks on the source device that have not been copied over cause the tracks on the source device to be copied to the target device.

A copy relationship may be established with multiple sub-copy relationships. Further, a copy relationship may define a source extent to copy to a target extent, where an extent comprises one or more sequential tracks. The same source extent may be copied to different extents on one or more target volumes. Further details of a FlashCopy operation to establish a copy relationship are described in the IBM publication "IBM TotalStorage Enterprise Storage Server: Implementing ESS Copy Services with IBM eServer zSeries", having document no. SG24-5680-04 (Copyright IBM, July 2004).

There is a need in the art for improved techniques for establishing a copy relationship.

SUMMARY

Provided are a method, system, and program for establishing copy relationships to copy source data to target data. A request is received to establish a copy relationship indicating to copy source data to target data. A determination is made as to whether the source data defined in the request comprises target data defined in a preexisting copy relationship. A determination is made as to whether base source data copied to the target data in the preexisting copy relationship also comprises the source data indicated in the request in response to determining that the source data defined in the request comprises target data in the preexisting copy relationship. A new copy relationship is defined to copy the determined base source data to the target data indicated in the request.

In a further embodiment, the determined base source data, the determined target data in the preexisting relationship and the target data indicated in the request are all in separate storage locations.

In a further embodiment, the base source data is defined as the source data in the preexisting copy relationship.

In a further embodiment, the base source data does not comprise target data in any preexisting copy relationship.

In a further embodiment, the request indicates to copy multiple source data units to multiple target data units and the new copy relationship comprises a first copy relationship to copy one source data unit to one target data unit. At least one additional copy relationship is defined to copy at least one source data unit indicated in the request to at least one target data unit indicated in the request that are not defined in the first copy relationship.

In a further embodiment, the source data units indicated in the request comprise target data units in a plurality of preexisting copy relationships, determining base source data comprises determining base source data units copied to the target data units in the preexisting copy relationships comprising source data units indicated in the request, and defining the new copy relationship comprises defining one new copy relationship for each of the preexisting copy relationships to copy the determined base source data units to the target data units indicated in the request.

In a further embodiment, an update is received to current data that is defined as source data in at least one copy relationship, including the new copy relationship and the preexisting copy relationship. The current data is written to target data defined in each copy relationship defining the current data as source data. The current data is capable of being written to target data defined in multiple copy relationships. The update to the current data is applied in response to writing the current data to the target data.

In a further embodiment, the source data and target data comprise either a track or an extent of sequential tracks.

DETAILED DESCRIPTION

Figure 1:
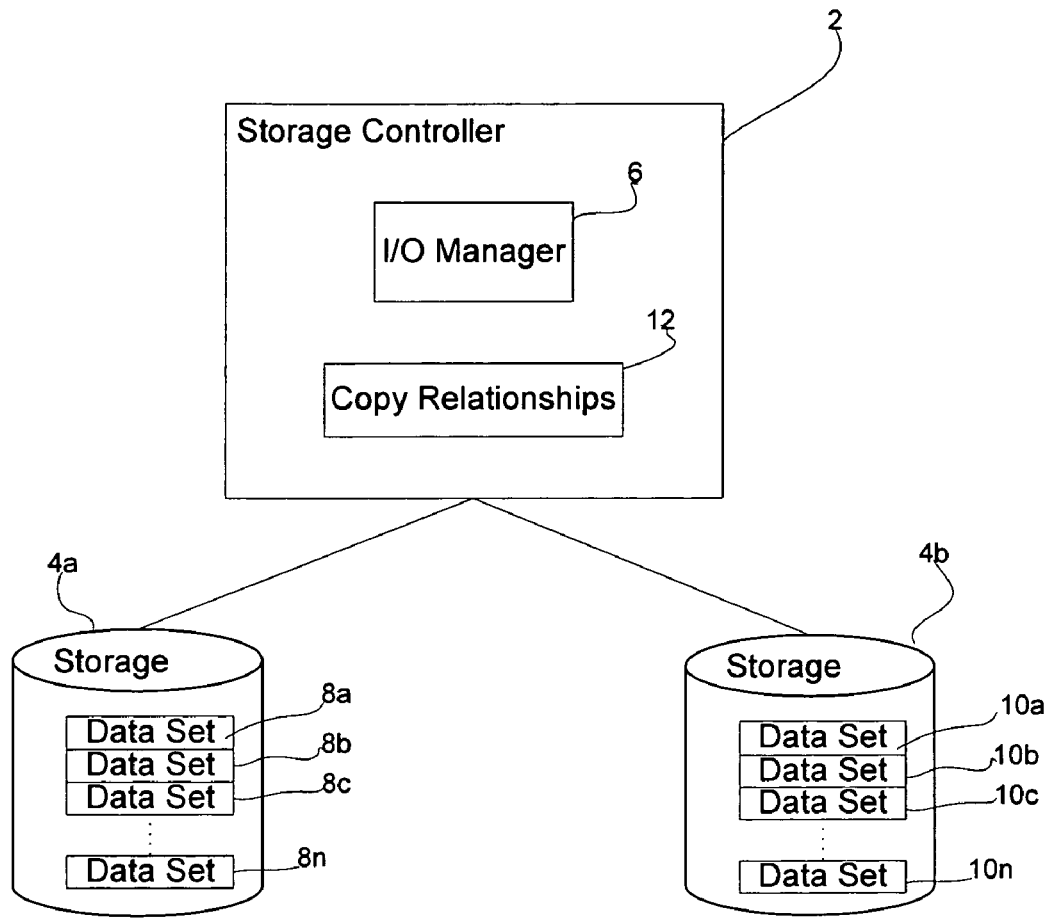
FIG. 1 illustrates an embodiment of a computing environment.

FIG. 1 illustrates an embodiment of a computing environment. A plurality of hosts (not shown) may submit Input/Output (I/O) requests to a storage controller 2 that manages access to data in storages 4a, 4b. The storage controller 2 includes an I/O manager 6 that has code used to manage I/O operations with respect to the storages 4a, 4b. Each storage 4a, 4b includes data sets 8a, 8b . . . 8n and 10a, 10b . . . 10n, where a data set may comprise a single basic storage unit, such as a track or fixed block address (FBA) or an extent of one or more sequential storage units. The I/O manager 6 may initialize and manage copy relationships 12 which comprise pairs of source data and target data, such that after the copy relationship is established for a source and target data pair, the source data is copied to the target data to provide a point-in-time copy of the source data. The data subject to the copy relationship may comprise an extent of multiple sequential tracks or a single track (or fixed block). The source and target data may be located in one or more volumes configured in the storages 4a, 4b.

The storage controller 2 may comprise a storage controller or server known in the art, such as the International Business Machines (IBM) Enterprise Storage Server (ESS)® (Enterprise Storage Server is a registered trademark of IBM). Alternatively, the storage controller 2 may comprise a lower-end storage server as opposed to a high-end enterprise storage server. The storages 4a, 4b may comprise separate storage devices, such as an array of storage devices, such as a Just a Bunch of Disks (JBOD), Direct Access Storage Device (DASD), Redundant Array of Independent Disks (RAID) array, virtualization device, tape storage, flash memory, etc. Alternatively, the storages 4a, 4b may comprise volumes or other logical partitions configured in a single storage device.

In a further embodiment, the storages 4a, 4b may be connected to different storage controllers that communicate over a network. In a further embodiment, one storage controller and storage may comprise a primary storage controller and primary storage whose data is source data copied to a secondary storage controller to store in target data in a secondary storage. In such primary and secondary site embodiments, an I/O manager on the primary controller or a separate data mover system may manage the copying of target data to source data between the primary and secondary sites.

Figure 2:
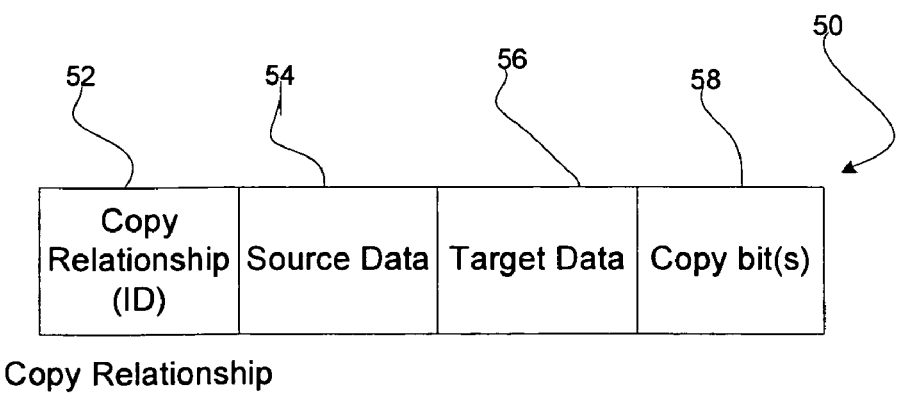
FIG. 2 illustrates copy relationship information for one copy relationship.

FIG. 2 illustrates an embodiment of copy relationship information 50 for one copy relationship, including a copy relationship identifier 52; the source data 54 and target data 56 subject to the relationship and a copy bit 58 for each track (or fixed block) involved in the copy relationship. The source and target data may comprise a single data unit, e.g., single track or fixed block, or an extent of sequential tracks or blocks.

Figure 3:
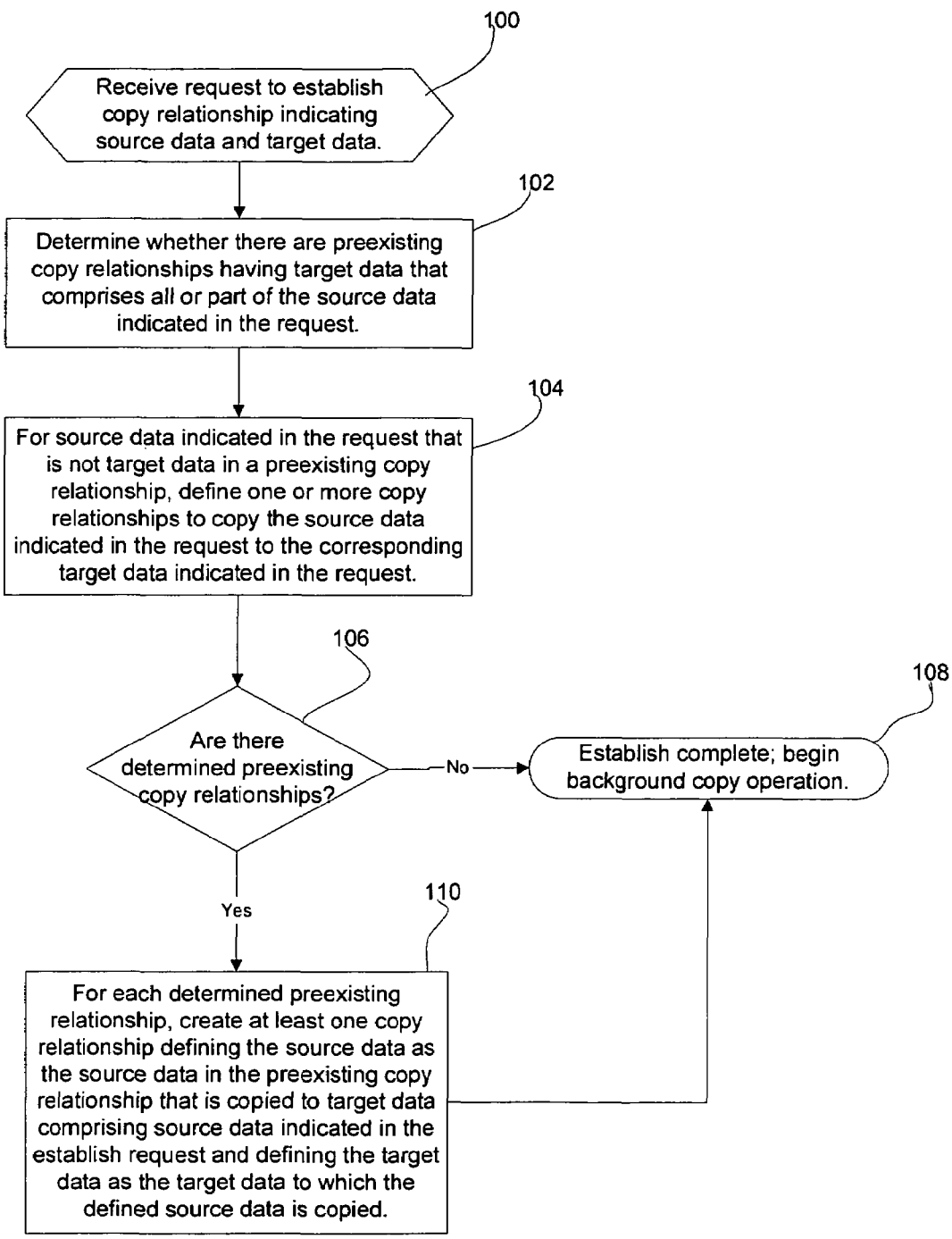
FIG. 3 illustrates an embodiment of operations to establish a copy relationship.

FIG. 3 illustrates an embodiment of operations implemented in the I/O manager 6 to establish a point-in-time copy relationship for indicated source data and target data comprising one or more data units, e.g., tracks or fixed blocks. Upon initiating (at block 100) the operation to establish a requested copy relationship, a determination is made (at block 102) of whether there are preexisting copy relationships having target data that comprises all or part of the source data indicated in the request, i.e., whether all or part of the source data indicated in the request comprises target data in another preexisting copy relationship. For source data (i.e., one or more data units) indicated in the request that is not target data in a preexisting copy relationship, the I/O manager 6 defines (at block 104) one or more copy relationships to copy the source data indicated in the request to the corresponding target data indicated in the request. In certain embodiments, the I/O manager 6 may define one copy relationship 50 for each track to be copied, such that the request to establish a copy relationship for multiple tracks is implemented as multiple copy relationships, one for each track in the requested copy relationship. Alternatively, each copy relationship implementing the requested established copy relationship may comprise an extent of consecutive tracks (or fixed blocks).

If (at block 106) there are no determined preexisting copy relationships, then the requested copy relationship is established (at block 108) and the I/O manager 6 may then begin a background copy operation to copy source data 54 to the target data 56 indicated in the one or more copy relationships created to implement the established copy relationship. Alternatively, the background copy operation may begin at a later time, such as during a time of light system usage. If "no background copy" is specified, then no background copy will take place unless an update arrives to a source data block. If an update arrives to a source data block, then that block may be copied to all targets before the update is applied to the source. The relationships for the updated blocks are removed and the source data block is updated with the new data. Upon completing the copying of one source track to a target track, the copy bit 58 is set to indicate that the data has been copied. After the one or more source tracks in a copy relationship are copied to the target, the copy relationship may be removed.

If (at block 106) there are determined preexisting copy relationships, then the I/O manager 6 creates (at block 110) for each determined preexisting copy relationship, at least one copy relationship defining the source data as the source data in the preexisting copy relationship that is copied to target data in the preexisting copy relationship that also comprises source data indicated in the establish request. The target data in the created copy relationship comprises the target data in the establish request to which the defined source data is copied. Control then proceeds to block 108 to complete the establishment of the copy relationship.

Figure 4:
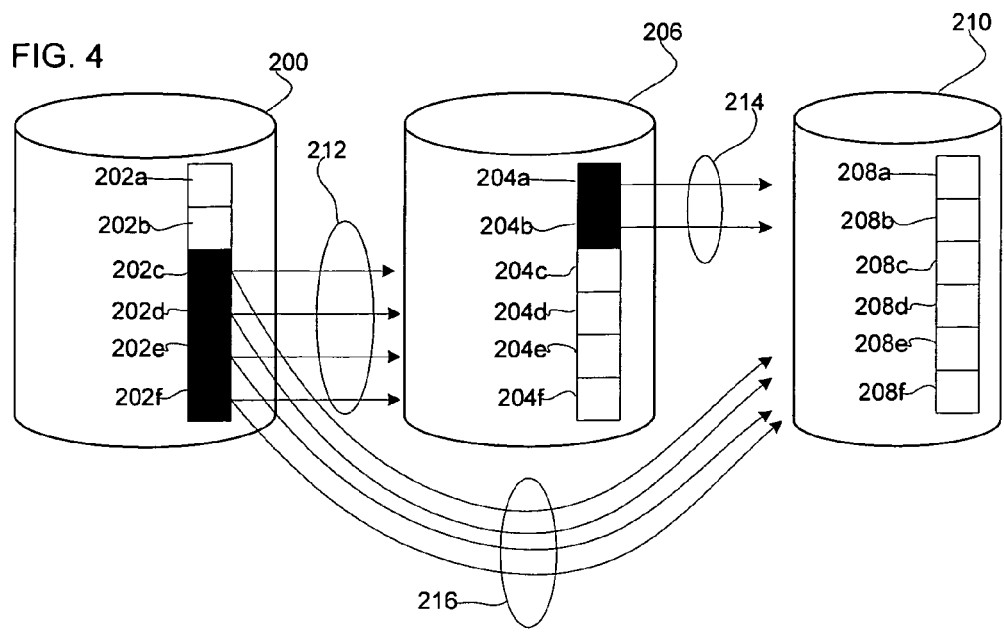
FIGS. 4 and 5 provide an example of how copy relationships are created to establish a requested copy relationship according to the operations of FIG. 3.
Figure 5:
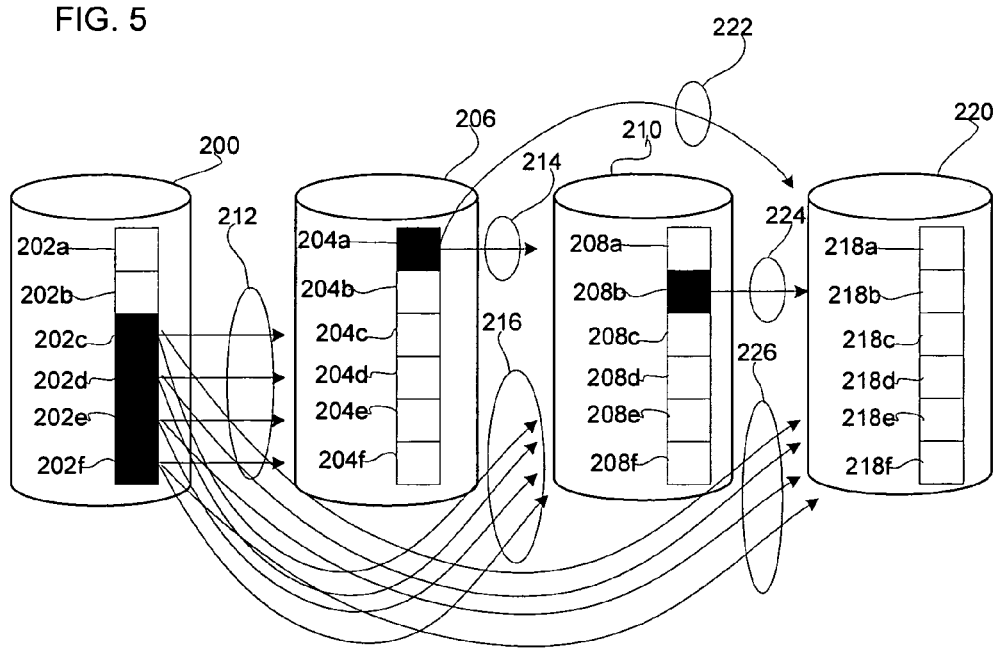

FIGS. 4 and 5 illustrate an example of how copy relationships are established when source data in a copy relationship to establish is target data in a preexisting copy relationship. With respect to FIG. 4, a first storage location 200 has tracks 202a, 202b . . . 202f, where tracks 202c, 202d . . . 202f are copied to tracks 204c, 204d . . . 204f in storage location 206 as part of a first copy relationship 212. The first copy relationship 212 may be implemented as a single copy relationship or four separate copy relationships, one for each track 202c . . . 202f. A subsequent request is then received to establish a point-in-time copy relationship from volumes 206 to 210. This requires establishing additional copy relationships to copy tracks 204a, 204b, and 204c . . . 204f in the storage location 206 to corresponding tracks 208a, 208b and 208c . . . 208f in storage location 210. According to the embodiment of operations in FIG. 3, this additional requested copy relationship is implemented as one copy relationship 214 to copy track 204a, 204b to 208a, 208b and another copy relationship 216 to copy the source tracks 202c . . . 202d to target tracks 208c . . . 208f. The copy relationship 216 includes the source tracks 202c . . . 202f in the preexisting relationship 212, because the source tracks 204c . . . 204f in the second establish request are target tracks in a preexisting copy relationship 212. The copy relationship 216 may comprise a single copy relationship having an extent of source 202c . . . 202f and target 208c . . . 208f tracks, or may be implemented as four separate copy relationships, one for each source and target track pair in the relationship 216.

FIG. 5 illustrates an example of what occurs when there is a third request to establish a point-in-time copy relationship from volumes 210 to 220, to have a relationship between the tracks 208a . . . 208f to tracks 218a . . . 218f in storage location 220. According to the operations of FIG. 3, to implement the third requested copy relationship, the I/O manager 6 creates a first copy relationship 222 to copy source track 204a to target track 218a because 204a is the source to track 208a in preexisting copy relationship 214; a second copy relationship 224 to copy source track 208b to target track 218b; and a third copy relationship 226 to copy base source tracks 202c . . . 202f to target tracks 218c . . . 218f, because source tracks 208c . . .

208*f* are defined as target tracks in the preexisting copy relationship 216 having source tracks 202*c* . . . 202*f*. In FIG. 5, block 204*b* may have been copied over to 208*b* and the relationship removed in response to receiving an update to 204*b* before receiving the third establish copy request. Because the relationship between 204*b* and 208*b*, as shown as 214 in FIG. 4, has been removed, 208*b* is copied to 218*b* as part of the copy relationship 224 to implement the subsequent third establish copy request. The storage locations 200, 206, 210, and 220 may be implemented in separate storage devices or in the same or separate volumes configured in one or more storage devices.

Figure 6:
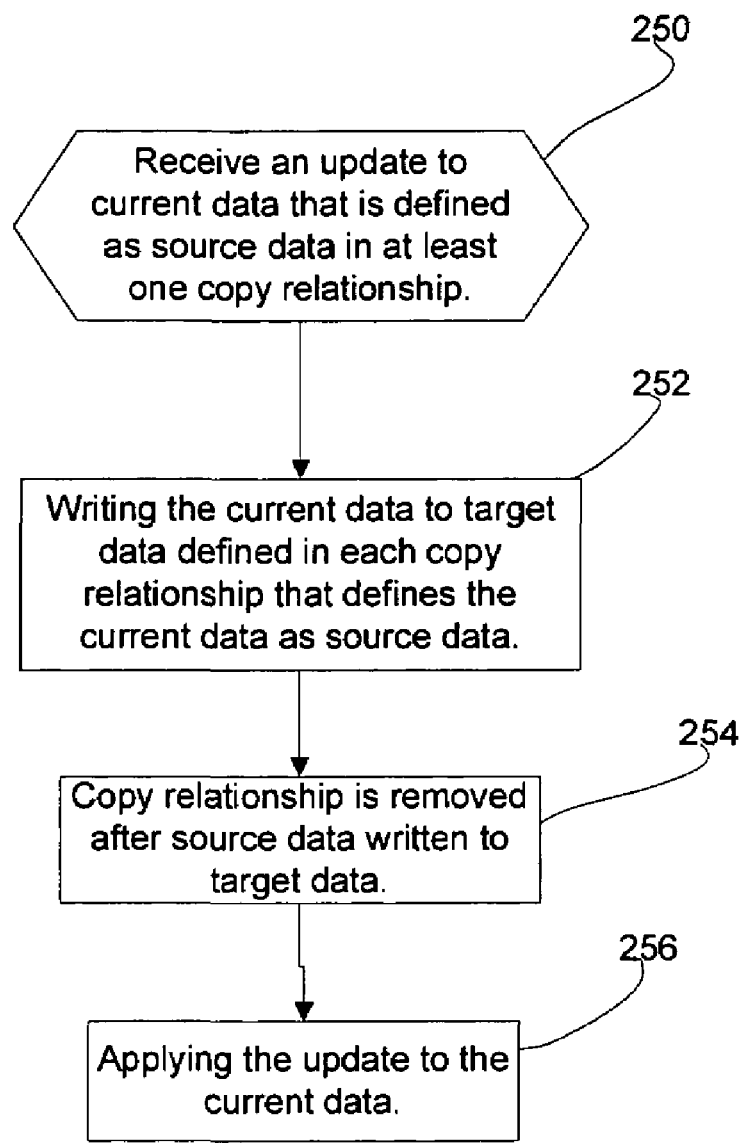
FIG. 6 illustrates an embodiment of operations to apply an update to source data defined in one copy relationship.

FIG. 6 illustrates an embodiment of operations to apply an update to a track having current data that comprises a source track 54 in a preexisting copy relationship 50. In response to receiving (at block 250) the update, the I/O manager 6 writes (at block 252) the current data to be updated to target data defined in each copy relationship that defines the current data as source data. After copying the current data to any target tracks in copy relationships, those copy relationships are removed (at block 254). The update is then applied (at block 256) to the current data.

Described embodiments provide a technique to establish a copy relationship that includes source data that may comprise target data in a preexisting copy relationship.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving a request to establish a copy relationship indicating to copy source data at a source storage location to target data at a target storage location, wherein the request indicates to copy multiple source data units to multiple target data units;

determining whether a portion of the source data units defined in the request comprises target data units defined in a preexisting copy relationship;

determining base source data units copied to the target data units in the preexisting copy relationship that also comprise a first part of the source data units indicated in the request in response to determining that the portion of the source data defined in the request comprises target data in the preexisting copy relationship;

defining a first copy relationship to copy the determined base source data units to a first part of the target data units indicated in the request to which the first part of the source data units are copied, wherein the preexisting relationship remains after defining the first copy relationship;

determining a second part of the source data units indicated in the request that does not comprise target data units in the preexisting relationship; and defining at least one additional copy relationship to copy the determined second part of the source data units to a second part of the target data units indicated in the request that are not defined in the first copy relationship, wherein the defined copy relationships are created in response to determining that the source data indicated in the request is partially within the preexisting relationship.

2. The method of claim 1, wherein the determined base source data, the determined target data in the preexisting relationship and the target data indicated in the request are all in separate storage locations.

3. The method of claim 1, wherein the base source data is defined as the source data in the preexisting copy relationship.

4. The method of claim 1, wherein the base source data does not comprise target data in any preexisting copy relationship.

5. The method of claim 1, wherein the source data units indicated in the request comprise target data units in a plurality of preexisting copy relationships, wherein determining base source data comprises determining base source data units copied to the target data units in the preexisting copy relationships comprising source data units indicated in the request, and wherein defining the first copy relationship comprises defining one new copy relationship for each of the preexisting copy relationships to copy the determined base source data units to the target data units indicated in the request.

6. The method of claim 1, further comprising:

receiving an update to current data that is defined as source data in at least one copy relationship, including the new copy relationship and the preexisting copy relationship;

writing the current data to target data defined in each copy relationship defining the current data as source data, wherein the current data is capable of being written to target data defined in multiple copy relationships; and applying the update to the current data in response to writing the current data to the target data.

7. The method of claim 1, wherein the source data and target data comprise either a track or an extent of sequential tracks.

8. The method of claim 1, wherein the operations to define the first copy relationship and the at least one additional copy relationship are performed as part of establishing the copy relationship.

9. The method of claim 8, further comprising:

completing the establishing of the requested copy relationship in response to defining the first copy relationship and the at least one additional copy relationship.

10. The method of claim 9, further comprising:

beginning a background copy operation to copy source data to target data in the defined first copy relationship and the at least one additional copy relationship in response to completing the establishing of the requested copy relationship.

11. A system in communication with storages, comprising:

a processor;

a computer readable storage medium including code executed by the processor to perform operations, the operations comprising:

receiving a request to establish a copy relationship indicating to copy source data at a source storage location to target data at a target storage location, wherein the request indicates to copy multiple source data units to multiple target data units;

determining whether a portion of the source data units defined in the request comprises target data units defined in a preexisting copy relationship;

determining base source data units copied to the target data units in the preexisting copy relationship that also comprise a first part of the source data units indicated in the request in response to determining that the portion of the source data defined in the request comprises target data in the preexisting copy relationship;

defining a first copy relationship to copy the determined base source data units to a first part of the target data units indicated in the request to which the first part of the source data units are copied, wherein the preexisting relationship remains after defining the first copy relationship;

determining a second part of the source data units indicated in the request that does not comprise target data units in the preexisting relationship; and defining at least one additional copy relationship to copy the determined second part of the source data units to a second part of the target data units indicated in the request that are not defined in the first copy relationship, wherein the defined copy relationships are created in response to determining that the source data indicated in the request is partially within the preexisting relationship.

12. The system of claim 11, wherein the base source data does not comprise target data in any preexisting copy relationship.

13. The system of claim 11, wherein the source data units indicated in the request comprise target data units in a plurality of preexisting copy relationships, wherein determining base source data comprises determining base source data units copied to the target data units in the preexisting copy relationships comprising source data units indicated in the request, and wherein defining the first copy relationship comprises defining one new copy relationship for each of the preexisting copy relationships to copy the determined base source data units to the target data units indicated in the request.

14. The system of claim 11, wherein the operations further comprise:
receiving an update to current data that is defined as source data in at least one copy relationship, including the new copy relationship and the preexisting copy relationship;
writing the current data to target data defined in each copy relationship defining the current data as source data, wherein the current data is capable of being written to target data defined in multiple copy relationships; and
applying the update to the current data in response to writing the current data to the target data.

15. The system of claim 11, wherein the operations to define the first copy relationship and the at least one additional copy relationship are performed as part of establishing the copy relationship.

16. The system of claim 15, wherein the operations further comprise:
completing the establishing of the requested copy relationship in response to defining the first copy relationship and the at least one additional copy relationship.

17. The system of claim 16, wherein the operations further comprise:
beginning a background copy operation to copy source data to target data in the defined first copy relationship and the at least one additional copy relationship in response to completing the establishing of the requested copy relationship.

18. An article of manufacture comprising a computer readable storage medium having code executed by a processor to communicate with storage locations and to perform operations, the operations comprising:
receiving a request to establish a copy relationship indicating to copy source data at a source storage location to target data at a target storage location, wherein the request indicates to copy multiple source data units to multiple target data units;
determining whether a portion of the source data units defined in the request comprises target data units defined in a preexisting copy relationship;
determining base source data units copied to the target data units in the preexisting copy relationship that also comprise a first part of the source data units indicated in the request in response to determining that the portion of the source data defined in the request comprises target data in the preexisting copy relationship;
defining a first copy relationship to copy the determined base source data units to a first part of the target data units indicated in the request to which the first part of the source data units are copied, wherein the preexisting relationship remains after defining the first copy relationship;
determining a second part of the source data units indicated in the request that does not comprise target data units in the preexisting relationship; and
defining at least one additional copy relationship to copy the determined second part of the source data units to a second part of the target data units indicated in the request that are not defined in the first copy relationship, wherein the defined copy relationships are created in response to determining that the source data indicated in the request is partially within the preexisting relationship.

19. The article of manufacture of claim 18, wherein the base source data does not comprise target data in any preexisting copy relationship.

20. The article of manufacture of claim 18, wherein the source data units indicated in the request comprise target data units in a plurality of preexisting copy relationships, wherein determining base source data comprises determining base source data units copied to the target data units in the preexisting copy relationships comprising source data units indicated in the request, and wherein defining the first copy relationship comprises defining one new copy relationship for each of the preexisting copy relationships to copy the determined base source data units to the target data units indicated in the request.

21. The article of manufacture of claim 18, wherein the operations further comprise:
receiving an update to current data that is defined as source data in at least one copy relationship, including the new copy relationship and the preexisting copy relationship;
writing the current data to target data defined in each copy relationship defining the current data as source data, wherein the current data is capable of being written to target data defined in multiple copy relationships; and
applying the update to the current data in response to writing the current data to the target data.

22. The article of manufacture of claim 18, wherein the operations to define the first copy relationship and the at least one additional copy relationship are performed as part of establishing the copy relationship.

23. The article of manufacture of claim 22, wherein the operations further comprise:
completing the establishing of the requested copy relationship in response to defining the first copy relationship and the at least one additional copy relationship.

24. The article of manufacture of claim 23, wherein the operations further comprise:
beginning a background copy operation to copy source data to target data in the defined first copy relationship and the at least one additional copy relationship in response to completing the establishing of the requested copy relationship.

* * * * *